United States Patent [19]

Kupersmit

[11] Patent Number: 5,274,910
[45] Date of Patent: Jan. 4, 1994

[54] SYSTEM FOR HANDLING CARGO CONTAINERS

[76] Inventor: Julius B. Kupersmit, 299 W. 12th St., New York, N.Y. 10014

[21] Appl. No.: 985,925

[22] Filed: Dec. 4, 1992

[51] Int. Cl.$^5$ .............. B23P 21/00; B23P 19/00; B23Q 7/10; B65G 1/00
[52] U.S. Cl. ..................... 29/773; 29/771; 29/784; 29/809; 29/822; 414/331; 414/799; 414/796.7; 414/416
[58] Field of Search ............... 29/771, 772, 773, 784, 29/799, 809, 429, 430, 822; 414/331, 799, 796.7, 416

[56] References Cited

U.S. PATENT DOCUMENTS

| | | | |
|---|---|---|---|
| 4,451,191 | 5/1984 | Torre | 414/796.7 |
| 4,479,600 | 10/1984 | Albright | 29/772 |
| 5,064,330 | 11/1991 | Kumagai | 414/331 |
| 5,158,424 | 10/1992 | Mojden et al. | 414/799 |

FOREIGN PATENT DOCUMENTS 2390256  1/1979  France .................. 29/772

Primary Examiner—P. W. Echols
Assistant Examiner—David P. Bryant
Attorney, Agent, or Firm—Charles E. Temko

[57] ABSTRACT

A system for the handling and storage of large capacity collapsible shipping containers particularly adapted for use at major airports handling large volumes of cargo. The system provides a specific location for storing large numbers of collapsed containers in planar juxtaposed vertical relation including a multicompartment rack. The pallet elements of the containers are separated during disassembly and are stored in a horizontal stack in a well adjacent the rack. The rack may be moveable from a point adjacent the well to permit a similar rack to be positioned in its place. Means is also provided for the movement to and from this location of erected containers for use at a remote location or the collapse of erected containers for storage in the rack.

4 Claims, 2 Drawing Sheets

SYSTEM FOR HANDLING CARGO CONTAINERS

BACKGROUND OF THE INVENTION

This invention relates generally to the field of collapsible shipping containers, and more particularly to an improved system for handling and storing individual containers used for air transport.

In the present state of the art, such containers are equal in size to that used for railroad shipments, and some are comparably sized to containers used in ocean transport. An aircraft container commonly used measures eight feet wide by eight feet long with a height of seven feet. It typically weighs 650 pounds when empty. Such containers are intended for reuse, and are preferably constructed so as to permit the same to be collapsed for storage or for a return trip. Upon return, and before reloading, they present a problem of storage, including protection from the elements, and the occupation of considerable space at the airport where reloading normally takes place. In the case of older noncollapsible designs, the problem is even more serious, in that while such containers are normally capable of resisting the effects of the weather, they occupy still more space at the airport during storage, and because of their size, they are not readily stackable to a substantial degree. Further, because of physical space limitations, the containers must be stored at areas of the airport at a substantial distance from the point where they are reloaded.

SUMMARY OF THE INVENTION

Briefly stated, the invention contemplates the provision of an improved system for handling the supplying and storage of large numbers of collapsible containers at a single location requiring a comparably small area at an airport which location may be located relatively close to loading zones.

To this end, the system includes one or more generally rectangularly configured storage racks which are capable of enclosing a plurality of collapsed wall elements of containers in juxtaposed vertical orientation, with the pallet elements detached therefrom. The pallets are stored in stacked horizontal orientation in a well recessed below ground level and adjacent the storage rack. In a preferred embodiment, the storage racks are mounted upon conveyor means, so that when empty or full, they may be moved to an adjacent location, and a fresh rack positioned in its place. In a similar manner, the well is provided with adjacent conveyor means which enable the arrival of expected empty containers for collapsing and storage, and the transport of erected containers to a remote station for loading cargo prior to loading the containers within an aircraft. The system is adapted, without adjustment, to handle containers of varying configuration and types of construction.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
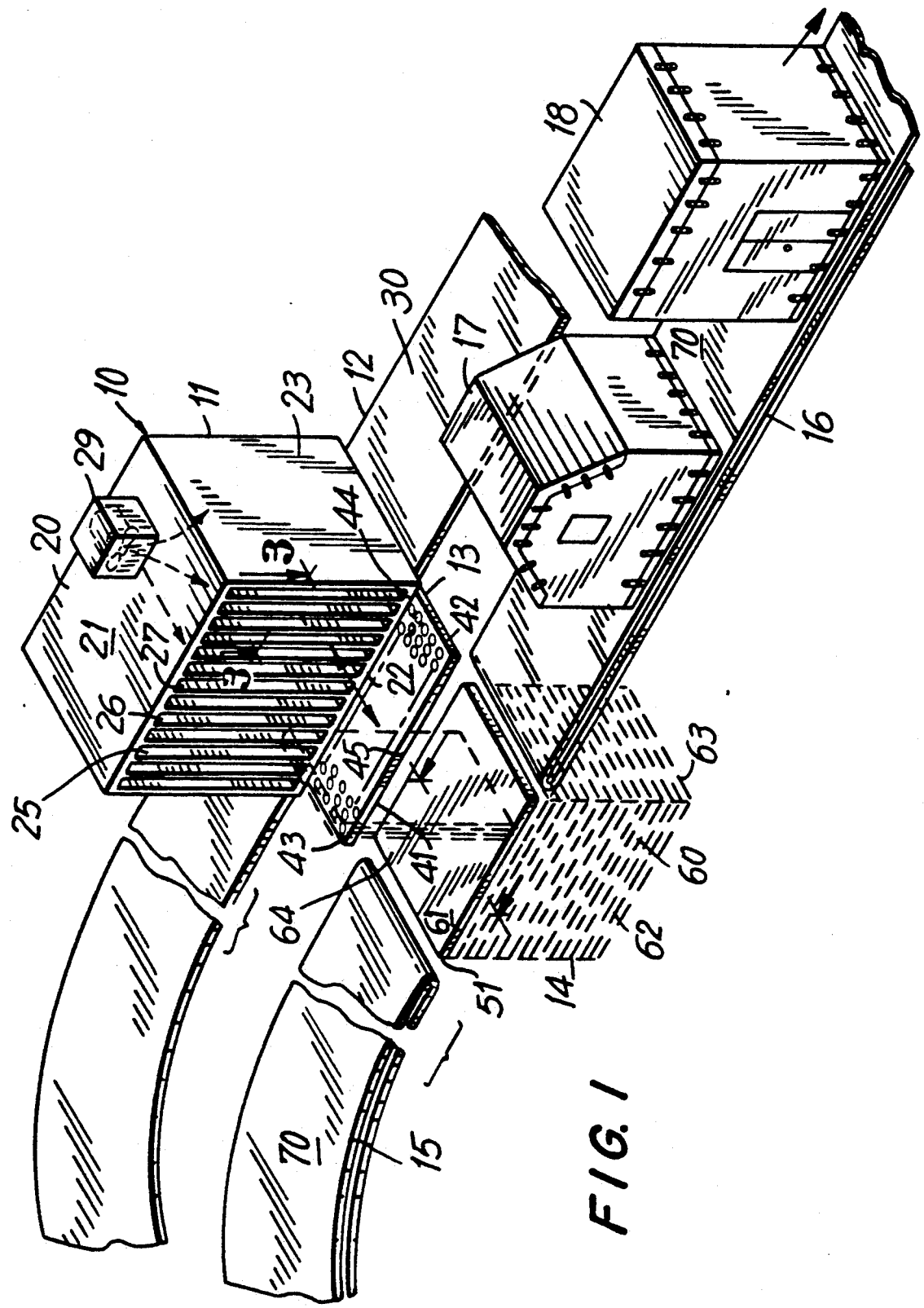
FIG. 1 is a schematic view in perspective of an embodiment of the invention.
Figure 2:
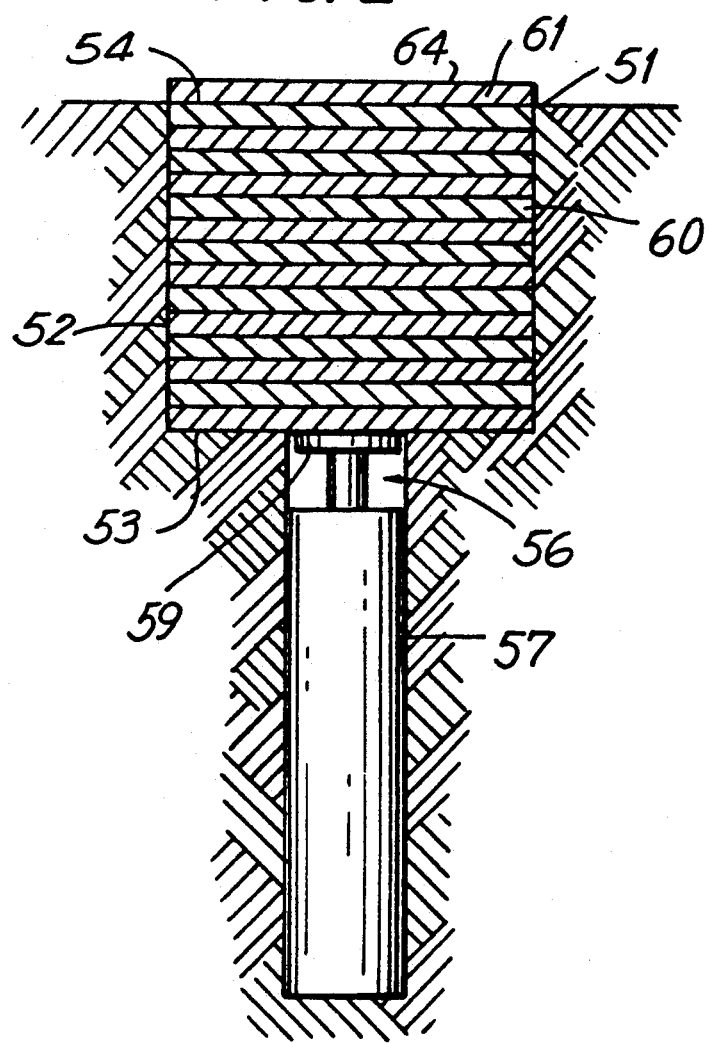
FIG. 2 is a schematic section view of a pallet receiving well element forming a part of the embodiment.
Figure 3:
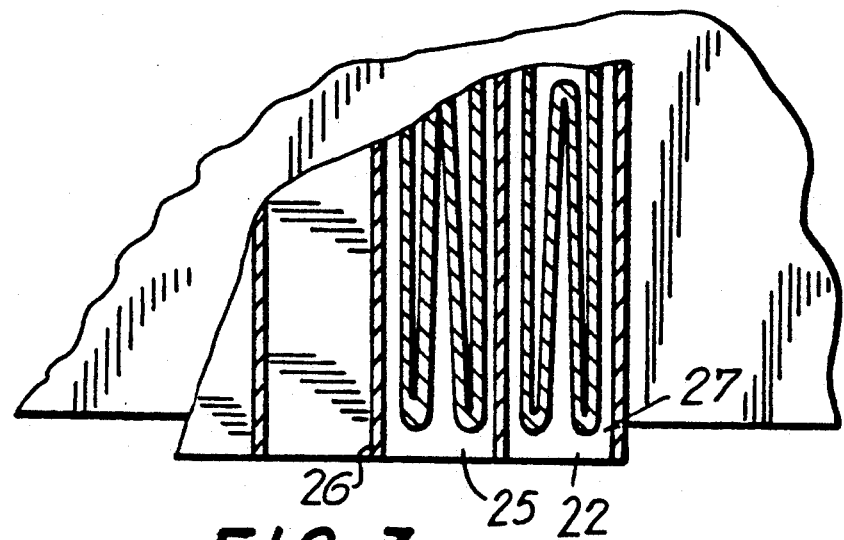
FIG. 3 is an enlarged fragmentary view in elevation as seen from the plane 3—3 in FIG. 1.

In accordance with the invention, the embodiment (FIG. 1) generally indicated by reference character 10, comprises broadly a plurality of container rack storage elements, one of which is indicated by reference character 11, and associated rack conveyor element 12, a fixed roller type conveyor element 13, a pallet storage well element 14, associated first and second conveyor elements 15 and 16, respectively, the embodiment being used in connection with any of a plurality of different types of collapsible shipping containers, two of which are indicated by reference characters 17 and 18.

The container rack elements 11 are substantial identical, and, accordingly, a description of one of the same will serve to describe all. Each element includes a generally rectangular housing 20 bounded by an upper wall 21, a lower wall 22, side walls, one of which is indicated by reference character 23, and a rear wall (not shown). The housing defines a front opening 25 through which folded wall members of individual containers may be inserted to be supported between vertical septums 26 which define corresponding slots 27. If required, an optional front door (not shown) may be also provided, as is an optional ventilating fan housing 29, desirable where the elements 41 are stored outdoors at relatively elevated temperatures.

The rack conveyor element 12 may be in the form of a moving belt 30 driven by a prime mover (not shown), or may be of the well-known ball or roller type (also not shown). Where the system is located a considerable distance from remote loading points at the airport, it may also be feasible to construct a small railroad siding serviced by a prime mover capable of moving as many as a dozen rack elements at the same time.

Positioned adjacent the opening in the rack element is the fixed roller type conveyor element 13 which facilitates the movement of stored folded wall members of a container from the rack element to the area of the storage well element 14 where erection and collapsing of the containers is manually performed. Ideally, it comprises a simple frame 41, bounded by end edge members 42 and 43, a leading edge 44 and a trailing edge 45. As the details of this type of conveyor are well known in the art, further details are not considered to be a part of the present disclosure.

The pallet storage well element 14 is adapted to store a horizontal stack of pallet elements below ground level, raising them to ground level for assembly or disassembly of an individual container. Where this is not feasible, it is also possible to build a storage element which extends above the upper wall 21 of the rack element, including means to lower or raise individual pallets to ground level as required. In the embodiment illustrated, the well may be a steel or concrete housing extending below the assembly level 51 which includes four side walls 52, and a lower wall 53 to define an upper rectangular opening 54. A second recess 56 extends downwardly from the lower wall to enclose a pneumatic or hydraulic lift 57 having a vertical shaft and a horizontal pallet supporting wall 59. Again, the details of the lift 57 may include any desired control structure. In its simplest form, electric switch means, which is manually accessible to service personnel, can provide for incremental movement of the wall 59 in an either upward or downward direction a distance equivalent to the thickness of a single pallet.

Referring again to FIG. 1, there is illustrated, a stack of pallets 60, preferably made of aluminum, with the uppermost pallet 61 at proper level for pallet assembly or disassembly. Each pallet is bounded by longer edges 62, shorter edges 63, and defines an upper surface 64 upon which the lower continuous edges of the side walls of the container are positioned and interlocked by any of several well-known means.

The conveyor elements 15 and 16 are substantially similar, each of which may include a driven belt 70 which may be substituted by a rail spur or siding, which permits the transport of a relatively large number of assembled containers to and from the area of the well element.

OPERATION

Operation of the system will be apparent from a consideration of FIG. 1. Assume a call for a number of erected containers at a remote loading station. If not already present, a full rack of folded wall members for assembly with pallets is moved to the assembly location as shown in FIG. 1. The well element will normally contain pallets for assembled containers in quantities corresponding to the capacity of an individual rack element, but may, if desired, contain a capacity corresponding to that of several wall rack elements.

Assembly of unassembled containers is performed in normal manner, with the walls being withdrawn from the rack element and expanded from planar to rectangular configuration with the continuous lower edge interconnected to the upper surface of the pallet disposed therebeneath, following which they are moved from the area of location to the adjacent conveyor means for transport to the desired location, as explained above. In the case of containers of the type identified by reference character 17, the roof members are separable, and may be separately stored within the rack element. In the case of containers of the type indicated by reference character 18, the roof element is foldable and remains attached to the side walls as they are folded, so that the additional operation of attaching the roof if eliminated. The assembled containers now move to the desired location (not shown) where they are loaded prior to loading an aircraft.

In an alternative situation, assume that an aircraft has arrived to discharge multiple containers which are unloaded at the remote station. Once unloaded, and while still in erected condition, these containers are conveyed to the area of the well storage element, where the reverse of the above procedure is conducted, resulting in the pallets of the containers being returned to the stack in the well element, and the folded wall members of the container are re-stored in a storage rack element. Depending upon the number of containers processed, the use of several rack elements may be required, with each rack element being moved from position when full to be replaced by an empty one.

I wish it to be understood that I do not consider the invention to be limited to the precise details of structure shown and set forth in the specification, for obvious modifications will occur to those skilled in the art to which the invention pertains.

I claim:

1. A system for supplying and storing collapsible shipping containers of a type having a rigid horizontally oriented pallet, and collapsible side walls selectively attached at a lower continuous edge to said pallet, the system comprising:

a) at least one storage rack element including means for storing a plurality of collapsed detached side walls of a container in juxtaposed vertical position within said rack element, said rack element defining an opening for the removal of said collapsed side walls therethrough;

b) a pallet storage element including a rectangularly shaped recess extending below said rack element, said storage element selectively storing a plurality of pallets in horizontally stacked relation, and having lift means for positioning a single pallet in a stack at a level for assembly of the walls of a container thereupon, said pallet storage element being positioned adjacent the opening in said storage rack element; and c) means for conveying containers in erected condition to and from said pallet storage element.

2. The system in accordance with claim 1, further comprising conveyor means for selectively positioning additional storage rack elements adjacent said pallet storage element.

3. The system in accordance with claim 1, further comprising: roller conveyor means positioned between said pallet storage element and a storage rack element to facilitate transport of folded wall components of an unerected container therebetween.

4. The system in accordance with claim 1, in which said pallet storage element includes a well extending below ground level, and wherein the uppermost pallet in said plurality of pallets is positioned at ground level during assembly and disassembly of containers.

* * * * *